United States Patent

Mattia

[11] 4,409,006
[45] Oct. 11, 1983

[54] REMOVAL AND CONCENTRATION OF ORGANIC VAPORS FROM GAS STREAMS

[76] Inventor: Manlio M. Mattia, West Chester, Pa.
[21] Appl. No.: 328,033
[22] Filed: Dec. 7, 1981
[51] Int. Cl.³ .......................................... B01D 53/08
[52] U.S. Cl. ........................................ 55/28; 55/60; 55/62; 55/78
[58] Field of Search ............... 55/28, 34, 59, 60, 62, 55/74, 75, 77, 78, 181, 208, 387, 389, 390

[56] References Cited

U.S. PATENT DOCUMENTS

| | | | |
|---|---|---|---|
| 1,948,779 | 2/1934 | Abbott et al. | 55/62 X |
| 2,294,214 | 8/1942 | Seinfeld | 55/390 X |
| 2,347,829 | 5/1944 | Karlsson et al. | 55/390 X |
| 2,617,986 | 11/1952 | Miller | 55/390 X |
| 2,880,818 | 4/1959 | Dow | 55/62 |
| 2,993,563 | 7/1961 | Munters et al. | 55/78 X |
| 3,109,722 | 11/1963 | Dow | 55/62 X |
| 3,164,452 | 1/1965 | Westeren et al. | 55/62 X |
| 3,176,446 | 4/1965 | Siggelin | 55/34 X |
| 3,252,273 | 5/1966 | Stephens | 55/390 X |
| 3,713,272 | 1/1973 | Barrere, Jr. et al. | 55/62 X |

*Primary Examiner*—Robert H. Spitzer
*Attorney, Agent, or Firm*—Panitch, Schwarze, Jacobs & Nadel

[57] ABSTRACT

Organic vapors are removed from a gas stream and concentrated to a high degree in a continuous adsorption process. The vapor-laden gas passes through a portion of a cylindrical-shaped adsorber as it rotates in a plane normal to the gas flow. The rotating adsorber then moves through several stages including regeneration and cooling. The vapor-laden gas is spiked with recovered product to increase the loading on the adsorbent and thus provide a higher regenerating gas composition. Multi-stage regeneration assures a high recovery efficiency.

10 Claims, 5 Drawing Figures

REMOVAL AND CONCENTRATION OF ORGANIC VAPORS FROM GAS STREAMS

BACKGROUND OF THE INVENTION

The present invention relates to removal and concentration of organic vapors from gas streams. More particularly, this invention concerns economically concentrating and removing organic vapors from large volumes of gas containing low concentrations of organic vapors. Furthermore, the present invention can be used at any pressure and can be applied to both the pollution control and gas processing industries.

Much of the industrial air pollution that exists today is attributable to the emission of large volumes of gas contaminated with organic vapors at very low concentrations. An economical method of destroying the organic contaminants by incineration has been described in my U.S. Pat. No. 3,455,089 issued July 15, 1970 entitled "Process For Removing Organic Contaminants From Air". Also, an economical method of recovering these contaminants has been described in my U.S. Pat. No. 3,534,529 issued Oct. 20, 1970 entitled "Process For Recovering Organic Vapors From Air Streams". The two processes described in these patents involve cyclic operations and therefore could not provide the economy and flexibility of the continuous process described in my U.S. Pat. No. 4,231,764 issued Nov. 4, 1980 entitled "System For Removing Organic Contaminants From Air". The process of this patent utilizes a multistage fluid bed adsorption system; one stage for countercurrent adsorption, two or more stages for regeneration and one stage for cooling. While this process offered many advantages over previous processes, it also presented disadvantages which limited its acceptance in industry. These diadvantages included the high energy cost to maintain fluidization of the adsorbent, gradual attrition of the fluidized adsorbent, inability to process varying flow streams and the limiting vapor velocity required to avoid entrainment of the adsorbent.

A solvent concentrating system utilizing a rotating adsorbent bed is described in Bulletin 11B3 of Met-Pro Corporation, Harleysville, Pa.

Heretofore, it has been most difficult to recover organic contaminants from gases when they are present in low concentrations. Known processes require high investment and/or operating costs. Additionally, the excessive energy requirements for regeneration make many of these processes prohibitive.

SUMMARY OF THE INVENTION

This invention concerns a process for the removal and concentration of organic vapor from gas streams. This process involves continuously and simultaneously conducting various steps on different sections both above and below a rotating bed of adsorbent material and sequentially rotating the bed through the steps of: (1) passing organic vapor-laden gas in a direction normal to the bed through a first section to absorb organic vapor and to produce a gas stream having a reduced quantity of organic vapor; (2) passing a hot, partially inert regenerating gas in a direction normal to the bed through a second section to substantially regenerate the adsorbent material and to provide a partially inert gas stream rich in organic vapor, a portion of which forms a product stream and (3) passing a hot inert gas, substantially free of organic vapor in a direction countercurrent to the flow of the organic vapor-laden gas and normal to the bed through a third section to provide more complete regeneration of the adsorbent material thus permitting higher removal efficiency.

In a further embodiment of the process of this invention, the organic vapor-laden gas is spiked with recovered organic vapor to increase loading on the adsorbent and provide a higher concentration of organic vapor in the product stream. Also, in some process applications of this invention, cooling of the bed may be required. In cooling the bed of adsorbent material, a stream of cool inert gas is passed in a direction normal to the bed through a fourth section.

This invention also concerns an apparatus for the continuous removal and concentration of organic vapors from gas streams. The apparatus includes a housing, a axially rotatable bed of adsorbent material and a plurality of pie-shaped sections separated from each other by baffles. These sections are disposed both above and below the bed. The dividers can be movable to vary the cross-sectional area of the sections. The adsorbent material is disposed in a plurality of axial channels to substantially prevent lateral flow of gas.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE INVENTION

Figure 1:
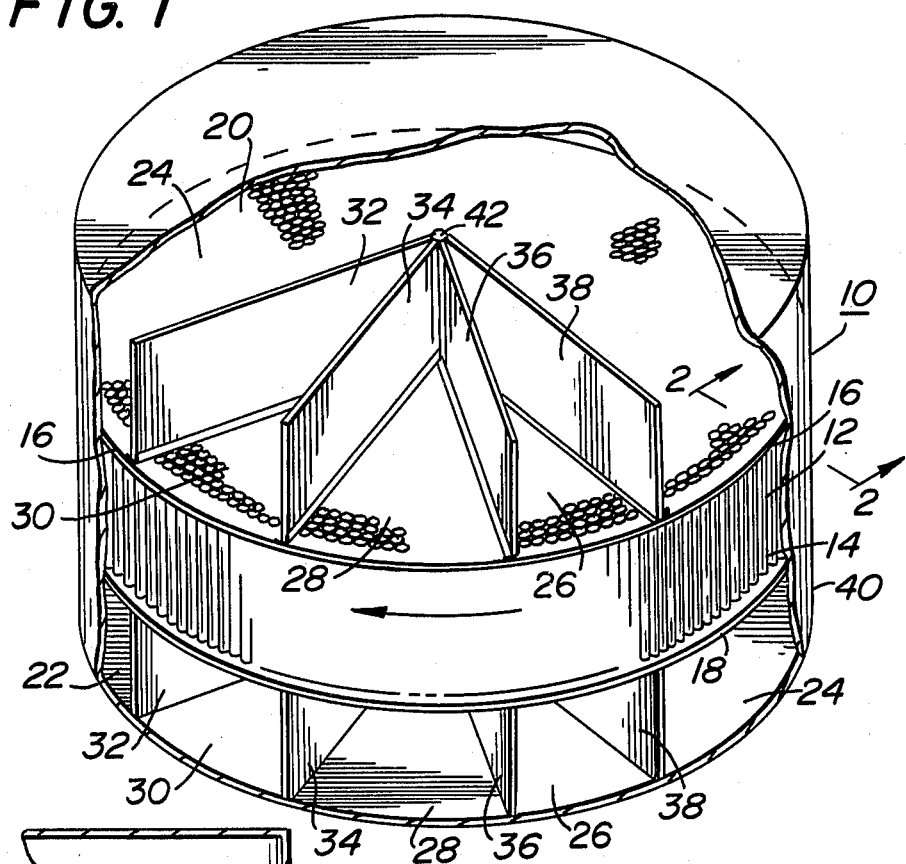
FIG. 1 is a perspective view having a cut-away section depicting an apparatus for continuous removal and concentration of organic vapors from gas streams.

Referring to the drawings, wherein like numerals indicate like elements, there is shown in FIG. 1 an adsorber apparatus 10 for the present invention. The cylindrical adsorber bed 12 can be made up of either granular, fibrous, or a porous solid material and can contain activated carbon, molecular sieves, silica gel, or other suitable adsorbent. The adsorbent material is encased in channels such as containers (cylinders) 14. The containers 14 are fabricated from any suitable non-permeable material. The cross-sectional size and shape of each container 14 is important only insofar as it provides maximum flow normal to the bed 12 without any substantial corresponding lateral flow through the bed 12. Containers 14 are packed with adsorbent in a manner which will permit a high gas flow rate therethrough and provide maximum contact of the flowing gas with the adsorbent. The containers 14 are packed tightly into the bed 12 between two perforated plates 16 and 18. The adsorbent containing containers 14 can be placed in the bed 12 from a single opening in the adsorber shell 40 while the bed 12 is rotated manually during the loading operation.

Figure 3:
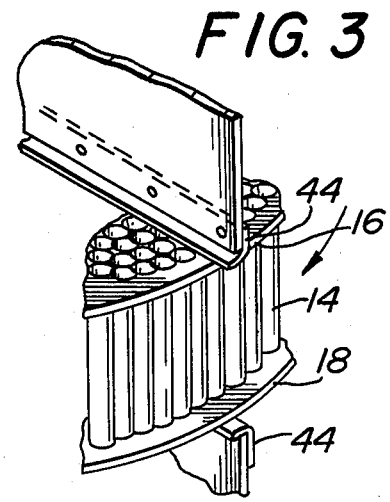
FIG. 3 is a partial perspective view showing in detail the adsorbent bed of the apparatus shown in FIG. 1.

Above and below the bed 12 are plenums 20 and 22 which are divided into four pie-shaped sections 24, 26, 28 and 30 by baffles 32, 34, 36 and 38 which direct the flow of gas through the bed 12. The baffles 32, 34, 36 and 38 in plenums 20 and 22 run from the center of the adsorber 10 radially out to the cylindrical adsorber shell 40. The baffles 32, 34, 36 and 38 are attached to a sleeve 42 in the center of the adsorber 10 through which a drive shaft (not shown) rotates. The baffles 32, 34, 36 and 38 fit tightly between the sleeve 42 and the adsorber shell 40. A radial seal 44 (see FIG. 3) is attached to each baffle 32, 34, 36 and 38 both above and below the bed 12 so as to prevent the flow of gas from one section to another. The seal 44 may be constructed of any suitable elastomeric material which will withstand the operating conditions in the adsorber 10. In applications involving high temperatures not suitable for elastomeric materials, the seal 44 could be fabricated from metallic materials. Such elastomers provide a better seal than metals. Accordingly, in lower temperature processes an elastomer seal is preferred. The seal 44 rides on the perforated plates 16 and 18 as the adsorber bed 12 slowly rotates.

The perforations in plates 16 and 18 communicate with the pie-shaped sections 24, 26, 28 and 30 and the containers 14 to allow gas to flow in a normal direction through the bed 12. It is anticipated that there will be numerous perforations per container 14. In some instances, it may be preferred that the containers 14 align with perforations in plates 16 and 18.

Figure 2:
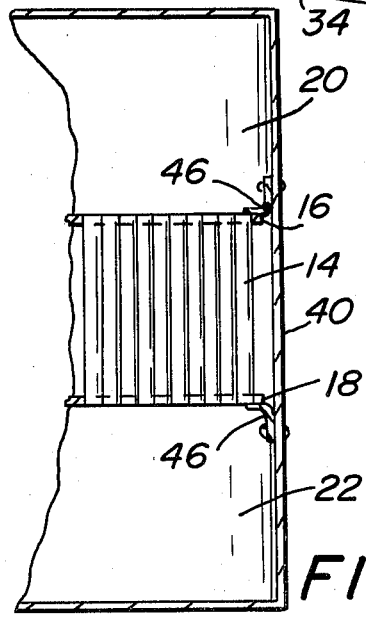
FIG. 2 is a sectional view taken along line 2—2 of FIG. 1.

A circumferential seal 46 (see FIG. 2) is attached to the adsorber shell along the entire circumference of the adsorber 10 both below and above the bed 12. This seal 46 is in contact with the perforated plates 16 and 18 as the bed 12 rotates. The circumferential seal 46 prevents gas from by-passing the adsorber bed 12. Like seal 44, the circumferencial seal 46 can be fabricated from a suitable elastomeric or metallic material depending on the processing conditions.

Special adjustments may be required where the radial baffle seal 44 meets the circumferential seal 46 in order to prevent gas leakage between the sections 24, 26, 28 and 30. A suitable design could be to slit the radial seal 44 at the junction of the circumferential seal 46 so that it rides firmly on the perforated plates 16 and 18 at this point.

Figure 4:
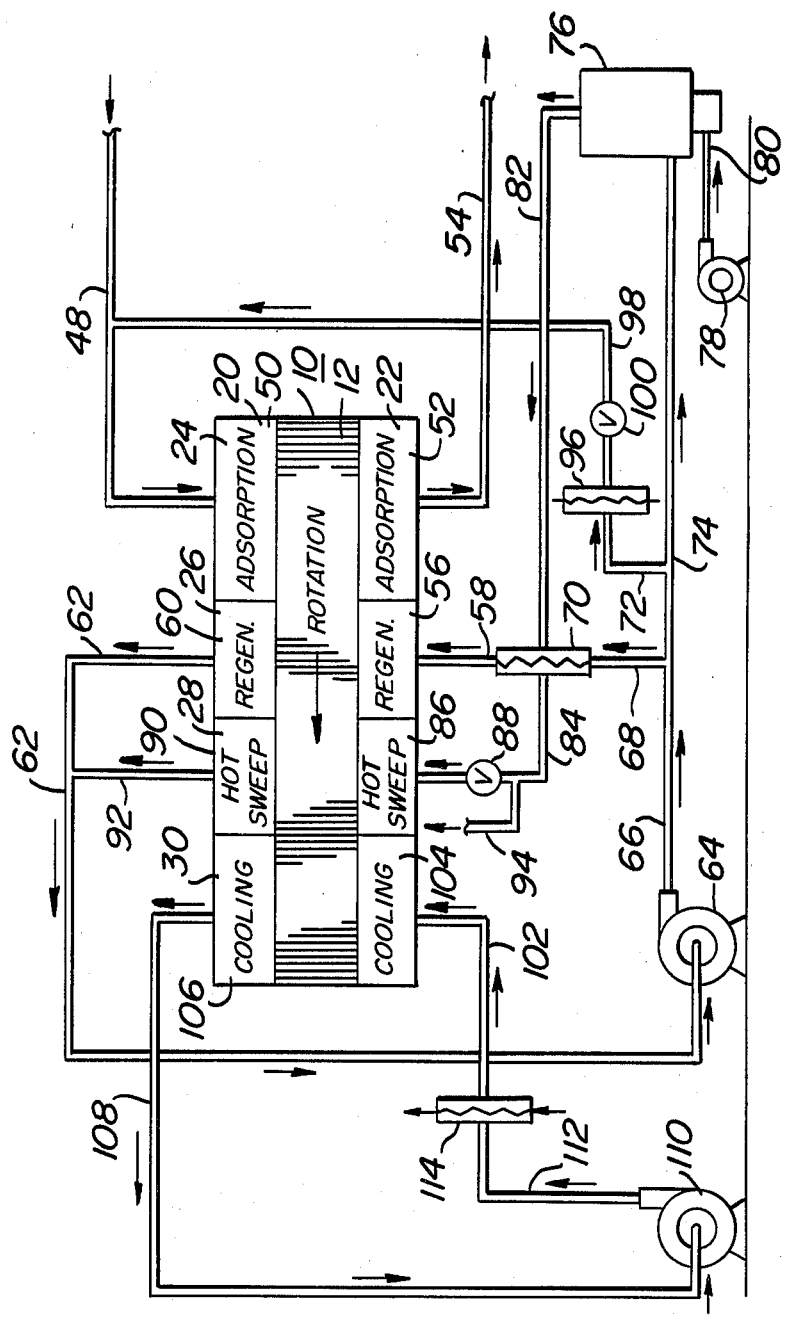
FIG. 4 is a schematic diagram showing one embodiment of the process of this invention wherein the concentrated organic vapor recovered is incinerated.

FIG. 4 is a schematic flow sheet of the process of this invention depicting the flow scheme when the concentrated organic vapors are to be incinerated so as to provide the heat and inert gas required for the regenerating systems.

In FIG. 4, the adsorber 10 is represented in schematic form. Partitioned sections above and below the rotating bed are dedicated specifically for adsorption, regeneration, hot gas sweep and cooling. These sections correspond respectively to pie-shaped sections 24, 26, 38 and 30 shown in FIG. 1.

A major portion of the bed 12 is the adsorption section 24 which is allocated for adsorbing organic vapor from organic vapor-laden gas streams. Another zone 26 is dedicated to hot gas regeneration. The next zone 28 is a hot, clean gas sweep which provides for more complete regeneration of the adsorbent material. Finally, in a gas cooling zone 30, the bed is cooled and prepared for adsorption.

Organic vapor-laden gas, such as air, enters the adsorber 10 through line 48, into the top of the first sub-plenum 50 in top plenum 20 through an inlet (not shown) and then flows vertically down through the adsorber bed 12 and into the bottom of the first sub-plenum 52. Organic vapors are removed from the gas by the adsorbent and relatively organic vapor free gas leaves sub-plenum 52 through an outlet (not shown) and then through conduit 54. This gas may be either discharged to the atmosphere or returned for further processing.

The adsorber bed 12 rotates continuously at a slow rate while plenums 20 and 24 containing the pie-shaped sections 24, 26, 28 and 30 remain stationary. The organic loaded adsorbent moves from the adsorption section 24 into the first regeneration zone 26 where the organic vapor is stripped from the adsorbent by hot, inert regenerating gas.

Hot, partially inert regenerating gas enters the bottom of the second sub-plenum 56 through conduit 58 and an inlet (not shown). The hot regenerating gas moves vertically up through the adsorber bed 12 into the top of the second sub-plenum 60 and then leaves through an outlet (not shown) and line 62. The hot regenerating gas containing stripped organic vapors flows to the hot gas regenerating blower 64 which discharges into line 66. The hot regenerating gas in line 68 flows through heat exchanger 70 where it is heated to provide the required temperature for regenerating the adsorbent. The hot regenerating gas then flows through line 58 back into the hot gas regenerating sub-plenum (bottom second sub-plenum) 56 through an inlet (not shown).

A slip stream is withdrawn from the hot regenerating gas loop through lines 72 and 74 respectively. Gas in line 74 flows into an incinerator 76. The high organic content in this gas stream provides the fuel for incineration. In the incinerator 76, the organic vapors are destroyed at elevated temperatures. Combustion air is provided by air blower 78 which is fed to incinerator 76 through line 80. The incinerator 76 provides the requisite heat and inert gas for regeneration of the adsorbent material as described in my U.S. Pat. No. 3,455,089.

Flow of combustion air to the incinerator 76 is controlled to maintain a low oxygen content in the flue gas which leaves incinerator through line 82 to produce a substantially inert gas. As used throughout the specification and claims herein, "inert gas" refers to gas having a low oxygen and carbon monoxide gas content. The use of inert gas in the process of this invention serves to reduce the incidence of hazardous conditions such as fires and explosions.

The hot flue gas flows to heat exchanger 70 where it heats the regenerating gas from line 68. The incinerator flue gas then flows through line 84 and enters the bottom of the third sub-plenum 86. The flow of hot incinerator flue gas, substantially inert, is controlled by valve 88 so as to provide the minimum flow necessary to remove residual organic vapors remaining in the partially regenerated adsorbent.

The organic vapor free incinerator flue gas (not sweep gas) provides a low partial pressure of organic vapor over the adsorbent so as to obtain a highly regenerated adsorbent. The hot sweep flows from sub-plenum 86 up through adsorber bed 12 and into the top of the third sub-plenum 90. This hot sweep gas now rich in organic vapor leaves sub-plenum 90 through an outlet (not shown) and then through line 92 where it combines with the hot regenerating gas in line 62. Excess flue gas not required for the hot gas sweep is discharged to the atmosphere through line 94.

Another slip stream leaves the hot gas regenerating system through line 72 and flows to cooler 96 where it is cooled to the temperature of the organic vapor-laden gas stream entering through line 48. The cooled regenerating gas, rich in organic vapor, is added to the organic vapor-laden feed stream through line 98. Valve 100 controls the flow of the cooled regenerating gas. Adding gas rich in organic vapors to the feed stream in line 48 provides a higher concentration of organic vapor contacting the adsorbent. Consequently, the organic vapor loading on the adsorbent is greatly increased. When this more highly loaded adsorbent is regenerated, a correspondingly higher organic vapor concentration is obtained in the regenerating gas. Since the adsorbent has been thoroughly regenerated, the higher organic vapor content in the feed gas can be removed at a very high efficiency level.

After the adsorbent has been swept with hot flue gas and a high degree of regeneration has been accomplished, the adsorber bed 12 rotates into the cooling zone. Cool inert gas from line 102 enters the bottom of the fourth sub-plenum 104 through an inlet (not shown) and flows up through the adsorber bed 12 into the top of the fourth sub-plenum 106. The cooling gas leaves through an outlet (not shown) and through line 108 where it flows to the cooling recirculation blower 110. The cooling gas then flows through line 112 through cooler 114 and re-enters the bottom of the fourth sub-plenum 104 through line 102 into an inlet (not shown).

The flue gas which enters the hot sweep section provides gas for the entire regeneration and cooling section. This is accomplished because hot sweep gas leaving the adsorber through line 92 is added to the regenerating system at line 62 thus maintaining a high level of inert gas in this system. Also, residual flue gas retained in the void spaces surrounding the adsorbent is carried to the cooling zone as the adsorber bed 12 rotates into that section. This action maintains a high level of inert gas in the cooling section.

The direction of flow of the cooling gas and the hot regenerating gas can either be co-current or counter-current relative to the flow of the organic vapor-laden feed gas. The hot gas sweep, however, is to flow counter-current relative to the flow of the organic vapor-laden feed gas in order to insure substantially complete regeneration of the adsorbent material.

In some process applications, cooling of the adsorbent material after the hot gas sweep would not be required. Accordingly, the entire cooling system would not be necessary.

Figure 5:
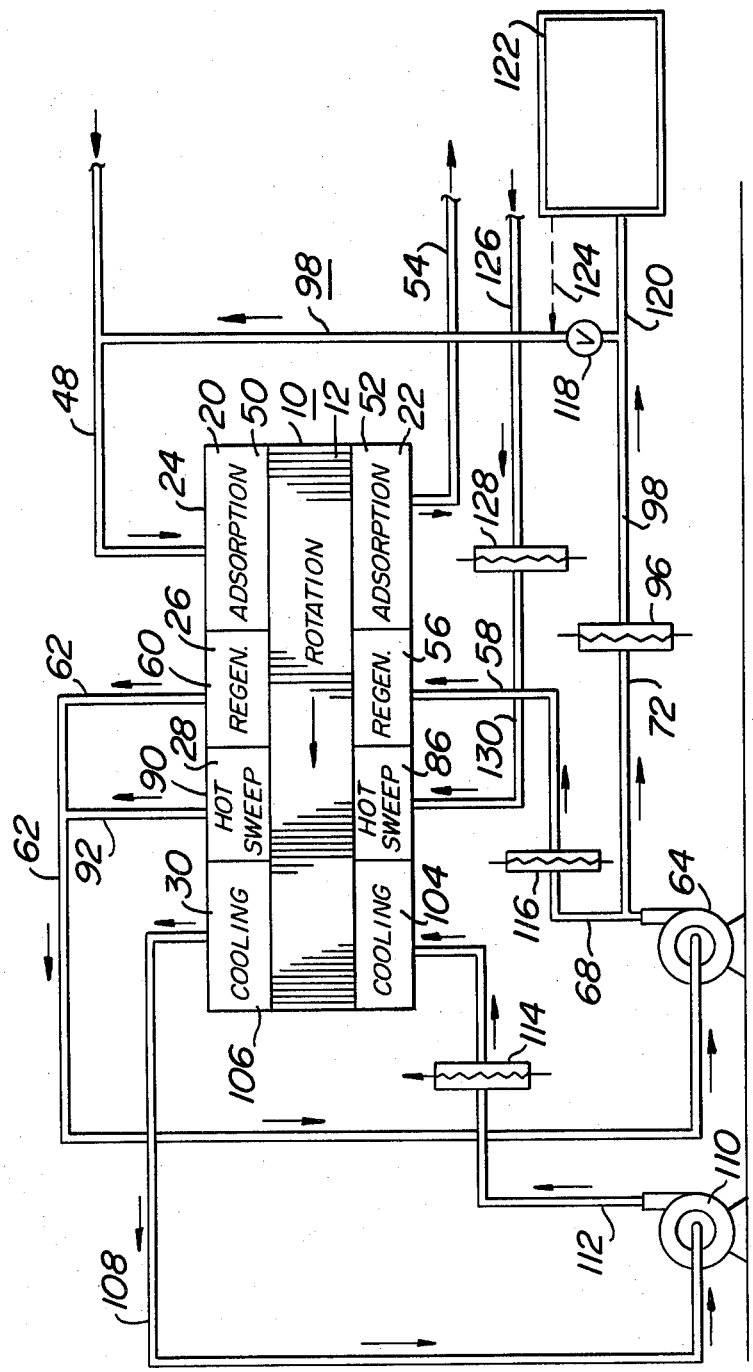
FIG. 5 is a schematic diagram depicting another embodiment of the process of this invention wherein concentrated organic vapor is recovered for reuse.

FIG. 5 is a schematic flow sheet of the process which is employed when the concentrated organic vapors are to be recovered. The adsorption and cooling systems for this process are identical to the systems described in FIG. 4 with only minor differences existing in the regeneration and the hot sweep systems.

Hot regenerating gas flows into the bottom of the second sub-plenum 56 and up through adsorber 12 where it strips organic vapor from the adsorbent. The rich, hot regenerating gas flows into the top of the second sub-plenum 60 and leaves the adsorber through line 62. The hot gas regenerating blower 64 forces the gas through line 68 to the regenerating gas heater 116 where the regenerating gas is heated by steam or some other external source of heat. The hot regenerating gas then flows through line 58 back into sub-plenum 56.

A slip stream leaves the regenerating system through line 72 where the organic rich regenerating gas is cooled in cooler 96 to a temperature generally below about 100° F. The temperatures of the cooling gas and regeneration gas are dependent on the nature of the adsorbent, the nature of the organic vapors removed and the desired degree of removal of organic vapors. The cooled gas flows through line 98. A controlled amount of this gas, as controlled by valve 118, flows through conduit 98 where it is added to the organic vapor-laden gas feed stream in line 48. The remainder of the gas is the recovered product which leaves the system through line 120. This highly concentrated organic vapor can be directed to a secondary recovery system 122 which could be, for example, a condensing tower as described in U.S. Pat. No. 4,231,764 or a small adsorber as described in U.S. Pat. No. 3,534,529. Any organic vapor not recovered in the secondary recovery system 122 can be returned to line 98 via conduit 124 and constitute the organic vapor stream which enriches the feed gas stream in line 48.

An outside source of inert gas enters the hot sweep system through line 126. The gas is heated to approximately 250° F. in the inert gas heater 129 and then flows through line 130 into the hot sweep sub-plenum 86. The hot sweep gas flows up through the adsorber into sub-plenum 90 and then continues to follow the flow pattern as described in FIG. 4.

A system of the present invention required to treat 20,000 CFM of air containing 200 ppm of toluene may be designed to the following specifications. An adsorber 13 feet in diameter would be partitioned so as to provide 70% of the cross-sectional flow area for adsorption and 10% each for regeneration, hot gas sweep and cooling. The adsorbent may be activated carbon packed to a depth of 2 feet. The adsorber would rotate once every four hours. Thus, each section of adsorbent will remain in the adsorption zone for three hours and in each of the other zones for 20 minutes. The following approximate face velocities are anticipated for each zone:

Adsorption: 200 Ft./Min.
Regeneration: 150 Ft./Min.
Hot Gas Sweep: 40 Ft./Min.
Cooling: 150 Ft./Min.

The working load on the adsorbent is conservatively estimated to be 10 lbs. of solvent to 100 lbs. of adsorbent. The regeneration and hot sweep gas temperature should be at approximately 300° F. Sufficient cooled regenerating gas is recycled to the organic vapor-laden air feed stream so as to increase the solvent concentration from about 200 ppm to about 500 ppm. Based on standard isotherms for toluene on granular activated carbon, the product gas flow should amount to only about 300 CFM of gas containing 1.4% toluene. This represents a 70 fold reduction in gas flow and a corresponding increase in solvent concentration.

The flow sheets described in FIGS. 4 and 5 can be modified so as to provide both solvent recovery and incineration. A portion of the product stream would then be incinerated to provide the heat and inert gas required for the regeneration and cooling systems.

The present invention provides the following advantageous features:
(1) an efficient and economical system for recovering organic vapors from gas streams and concentrating them to a much higher level;
(2) a novel system for removing organic vapors in a safe and continuous manner;

(3) a novel regenerating system which assures more complete regeneration of the adsorbent and thereby permits a higher removal efficiency;

(4) ability to obtain a 50 to 100 fold increase in vapor concentration with a corresponding reduction in volumetric gas flow.

The present invention may be embodied in other specific forms without departing from the spirit or essential attributes thereof and, accordingly, reference should be made to the appended claims, rather than to the foregoing specification, as indicating the scope of the invention.

I claim:

1. A process for the removal and concentration of organic vapor from gas streams comprising continuously and simultaneously conducting various steps on different sections both above and below a rotating bed of adsorbent material and sequentially rotating the bed through the steps of:
    (a) passing organic vapor-laden gas in a direction normal to said bed through a first section for adsorption of organic vapors and to produce a gas stream having a reduced quantity of organic vapor;
    (b) passing a hot, partially inert regenerating gas in a direction normal to said bed through a second section to substantially regenerate said adsorbent material and to provide a partially inert gas stream rich in organic vapor, a portion of which forms a product stream; and
    (c) passing a hot inert gas, substantially free of organic vapor, in a direction countercurrent to the flow of said organic vapor-laden gas and normal to said bed through a third section to provide more complete regeneration of said adsorbent material.

2. The process of claim 1 which further comprises spiking said organic vapor-laden gas with recovered organic vapor to increase loading on said adsorbent material and to provide a higher concentration of organic vapor in the product stream.

3. The process of claim 2 which further comprises cooling and introducing a slip stream of gas from said second section into said organic vapor-laden gas which is directed to said first section.

4. The process of claim 1 which further comprises passing a stream of cool inert gas in a direction normal to said bed through a fourth section to cool said adsorbent material.

5. The process of claim 4 wherein said inert cool gas is continuously cooled in a closed loop.

6. The process of claim 1 wherein said hot regenerating gas is continuously reheated in a closed loop.

7. The process of claim 6 which further comprises reheating said hot regenerating gas in a heat exchanger with a slip stream of gas exiting said second section which has been incinerated to remove organics.

8. The process of claim 1 wherein said hot inert gas, substantially free of organic vapor, is derived from a slip stream of gas exiting said second section which is incinerated to remove organics.

9. The process of claim 1 wherein said adsorbent is activated carbon.

10. The process of claim 1 wherein said hot inert gas, substantially free of organic vapor, is derived from an external source and a portion of the hot, partially inert regenerating gas which passes through said second section is cooled and directed to a secondary recovery system.

* * * * *